(12) United States Patent
Narum et al.

(10) Patent No.: US 12,099,237 B2
(45) Date of Patent: Sep. 24, 2024

(54) FIBER OPTIC CONNECTOR

(71) Applicant: COMMSCOPE TECHNOLOGIES LLC, Hickory, NC (US)

(72) Inventors: Mark D. Narum, Minnetonka, MN (US); Gregory Robert Mosier, Burnsville, MN (US); Scott L. Carlson, Bloomington, MN (US)

(73) Assignee: CommScope Technologies LLC, Hickory, NC (US)

( * ) Notice: Subject to any disclaimer, the term of this patent is extended or adjusted under 35 U.S.C. 154(b) by 891 days.

(21) Appl. No.: 17/056,379

(22) PCT Filed: May 17, 2019

(86) PCT No.: PCT/US2019/032898
§ 371 (c)(1),
(2) Date: Nov. 17, 2020

(87) PCT Pub. No.: WO2019/222646
PCT Pub. Date: Nov. 21, 2019

(65) Prior Publication Data
US 2021/0199890 A1  Jul. 1, 2021

Related U.S. Application Data

(60) Provisional application No. 62/672,973, filed on May 17, 2018.

(51) Int. Cl.
*G02B 6/245*  (2006.01)
(52) U.S. Cl.
CPC .................. *G02B 6/245* (2013.01)

(58) Field of Classification Search
CPC ...................................................... G02B 6/245
See application file for complete search history.

(56) References Cited

U.S. PATENT DOCUMENTS 7,934,874 B2 * 5/2011 Honma ................ G02B 6/3889
385/97
2004/0057676 A1  3/2004 Doss et al.
(Continued)

FOREIGN PATENT DOCUMENTS

| EP | 2 963 466 A1 | 1/2016 |
| JP | 2011-128544 A | 6/2011 |
| WO | 2015/103783 A1 | 7/2015 |

OTHER PUBLICATIONS

International Search Report and Written Opinion of the International Searching Authority for International Patent Application No. PCT/US2019/032898 mailed Sep. 26, 2019, 12 pages.

*Primary Examiner* — Sung H Pak
(74) *Attorney, Agent, or Firm* — Merchant & Gould P.C.

(57) ABSTRACT

A fixture for retaining an optical connector holder and optical fibers for splicing in an optical fiber stripping machine is disclosed. The fixture enables for two optical fibers of the connector to be appropriately aligned such that they can be simultaneously stripped in a standard optical fiber stripping machine. In one example, the fixture includes a main body extending between a first end and a second, a cavity defined within the main body the cavity, the cavity being for receiving an optical cable holder of an optical fiber connector, a first fiber retention structure for holding the optical fibers extending from the connector holder, and a second fiber retention structure for holding the optical fibers.

17 Claims, 16 Drawing Sheets

(56) References Cited

U.S. PATENT DOCUMENTS

2012/0243839 A1 9/2012 Tamekuni et al.
2015/0338582 A1 11/2015 Halls et al.

\* cited by examiner

LC duplex right

FIBER OPTIC CONNECTOR

CROSS-REFERENCE TO RELATED APPLICATION

This application is a National Stage Application of PCT/US2019/032898, filed on May 17, 2019, which claims the benefit of U.S. Patent Application Ser. No. 62/672,973, filed on May 17, 2018, the disclosures of which are incorporated herein by reference in their entireties. To the extent appropriate, a claim of priority is made to each of the above disclosed applications.

BACKGROUND

Modern optical devices and optical communications systems widely use fiber optic cables. A typical fiber optic cable includes one or more optical fibers contained within a protective jacket. Reinforcing structures such as aramid yarns and/or fiber reinforced epoxy rods can be used to provide reinforcement to the optical cables. It is well understood that a typical optical fiber includes a glass fiber processed so that light beams transmitted through the glass fiber are subject to total internal reflection wherein a large fraction of the incident intensity of light directed into the fiber is received at the other end of the fiber. A typical optical fiber includes a glass core surrounded by a cladding layer having a lower refractive index as compared to the refractive index of the core. The cladding causes light to be confined to the core by total internal reflection at the boundary between the two. The cladding layer of an optical fiber is often covered by one or more polymeric coatings (e.g., acrylate) to protect the glass and to facilitate handling of the optical fiber.

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a fusion splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule assembly includes a ferrule that functions to support an end portion of at least one optical fiber (in the case of a multi-fiber ferrule, the ends of multiple fibers are supported). The ferrule has a distal end face at which a polished end of the optical fiber is located. When two optical fibers are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter including an alignment sleeve that receives and coaxially aligns the ferrules of the fiber optic connectors desired to be interconnected. For certain styles of fiber optic connectors, the optical fibers are secured within their respective ferrules by a potting material such as epoxy.

To construct a fiber optic connector, the ends of the optical fibers must first be stripped, which is generally performed by a fiber stripping machine. In order for the fibers to be appropriately stripped, the fibers must be oriented in a specific manner within the fiber stripping machine.

SUMMARY

A fixture for retaining an optical connector holder and optical fibers for splicing in an optical fiber stripping machine is disclosed. In one aspect, the fixture includes a main body extending between a first end and a second, a cavity defined within the main body the cavity, the cavity being for receiving an optical cable holder of an optical fiber connector, a first fiber retention structure for holding the optical fibers extending from the connector holder, and a second fiber retention structure for holding the optical fibers.

In some examples, the cavity extends from the first end to the second end of the main body.

In some examples, the fixture additionally includes a door operable between an open position and a closed position, wherein when the door is in the open position, the cavity is unobstructed by the door, wherein when the door is in the closed position, a portion of the cavity is covered by the door.

In some examples, the fixture includes magnet for securing the door in the closed position.

In some examples, the first and second fiber retention structures are aligned with a longitudinal axis of the main body.

In some examples, the first fiber retention structure includes a pair of channel structures separated by a central member.

In some examples, the first fiber retention structure is defined by a pair of sidewalls, wherein each of the pair of sidewalls includes an overhang portion extending over the channel structures.

In some examples, the second fiber retention structure includes a pair of channel structures separated by a central member.

In some examples, the central member includes a pair of overhang portions extending over the pair of channel structures.

In some examples, the main body is a molded polymeric part.

In some examples, the first and/or second fiber retention structures are integrally molded with the main body.

In some examples, the magnet is received within a recess formed within the main body.

In one aspect of the disclosure, a method for stripping optical fibers of an optical connector is presented. In one example, the method includes providing a fixture including a main body having a cavity and at least one fiber retention structure, the main body defining a longitudinal axis, securing an optical cable to a holder of the connector such that at least two optical fibers extend beyond the holder, inserting the holder into the fixture cavity such that the at least two optical fibers extend beyond the fixture main body, routing the at least two optical fibers through the at least one fiber retention structure such that a portion of the at least two optical fibers extending beyond the fixture main body are in a generally parallel, spaced apart arrangement, and oriented in a generally parallel relationship to the longitudinal axis of the fixture main body, inserting the fixture into an optical fiber stripping machine; and stripping a portion of the at least two optical fibers.

In some examples, the method further includes the step of closing a door of the fixture to secure the at least two optical fibers within the cavity.

In some examples, the at least two optical fibers includes two optical fibers.

DETAILED DESCRIPTION

This disclosure is directed to methods and associated structures for stripping the individual fibers 150a, 150b of a fiber optic cable 150 such that a connector 10 can be constructed. In general, the method and associated structures for accomplishing this stripping function are shown at FIGS. 1 to 33 while the constituent components of a finished connector 10 are shown at FIGS. 32-33.

Connector 10

Figure 32:
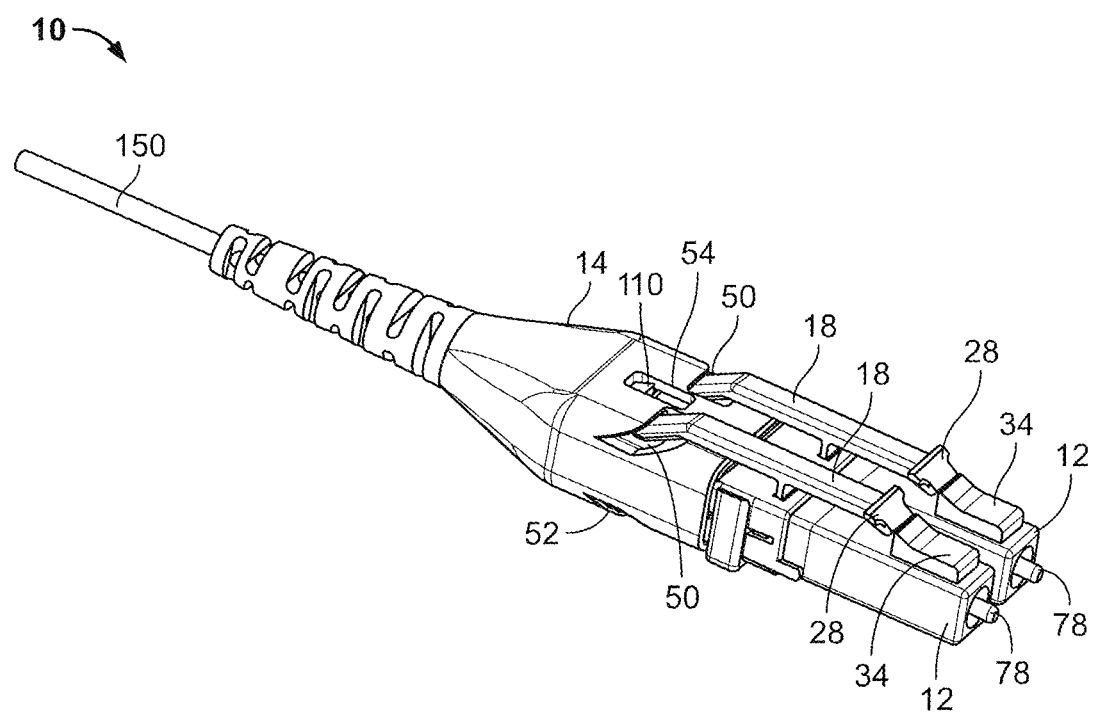
FIG. 32 is a perspective view of an exemplary connector having a holder usable with the fixture shown in FIG. 1.
Figure 33:
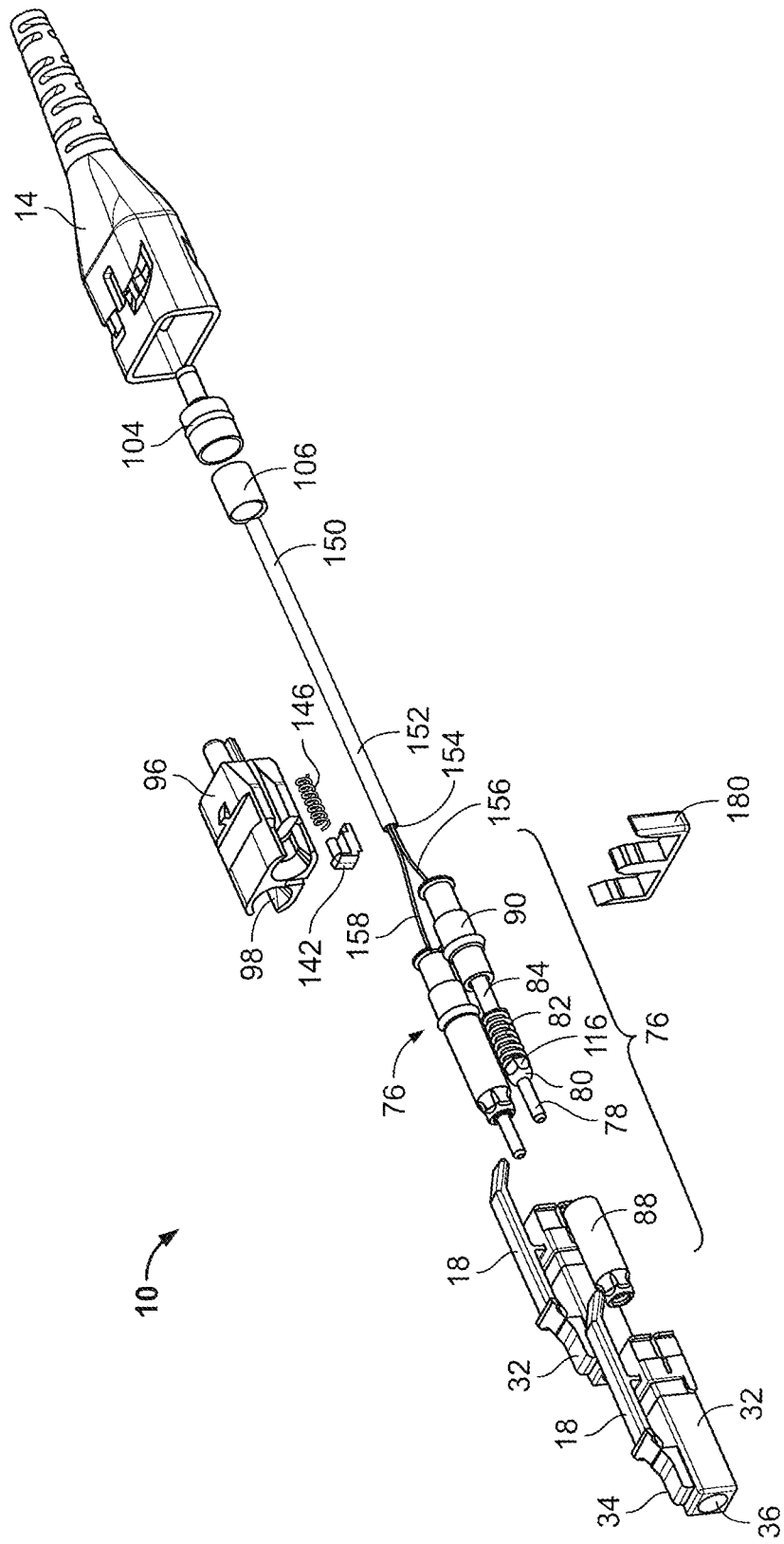
FIG. 33 is an exploded perspective view of the connector shown in FIG. 32.

Referring to FIGS. 32-33 an example connector 10 is presented. An example connector 10 is presented in further detail in PCT Patent Application Publication WO 2015/103783, filed on Jan. 13, 2014 and entitled Fiber Optic Connector, the entirety of which is incorporated herein by reference.

As presented, the example connector 10 includes two fiber optic connector portions 12 and a boot 14. Connector portions 12 each include a ferrule 78 for holding a fiber 156, 158 of the fiber optic cable 150. Connector 10 may also be referred to as duplex connector assembly or duplex connector. Connector 10 is mateable to an adapter (not shown).

The two connector portions 12 of connector 10 are arranged in a parallel position. Each connector portion 12 has a latch 18 including a latch body with a proximal end and a distal end. Latch 18 pivots around a connection point during latching and unlatching of latch 18. Latch 18 secures connector 10 to the adapter. Boot 14 is movable away from connector portions 12 in a longitudinal direction causing pivoting movement of latch 18 about connection point 26. Such pivoting movement allows for unlatching of connector portions 12 from adapter 200. Boot 14 simultaneously moves both latches 18 to allow for connector 10 to be unlatched from a duplex adapter or adapters with side-by-side ports 210. Latch body 20 includes a shoulder 28 which mates with latching shoulder of the adapter to secure the connector 10 to the adapter.

In the illustrated embodiment, each connector portion 12 defines an LC profile, meaning that the connector portion 12 can mate with an LC adapter.

Boot 14 includes slots 50 which receive distal ends of latch 18. Slots 50 and proximal ends are angled so as to cause a lifting motion for proximal ends which results in a downward movement of distal ends of latch 18 when boot 14 is pulled longitudinally away from a remainder of connector 10. Accordingly, a user can pull on boot 14 in a longitudinal direction away from the ferrules, and remove the connector 10 from the adapter, without directly engaging latches 18.

Connector portion 12 includes a front housing 32 and a ferrule assembly 76. Ferrule assembly 76 includes a ferrule 78, a hub 80 which holds the ferrule 78, and a spring 82 which biases hub 80 and ferrule 78 toward front housing 32. A front sleeve 88 and a rear sleeve 90 are mounted together with the ferrule 78, the hub 80, and the spring 82 housed inside to form the ferrule assembly 76. An internal tube 84 is provided extending from the hub 80. Tube 84 prevents epoxy from interfering with the movement of the ferrule 78, the hub 80 and the spring 82. The rear sleeve 90 is received in holder 96 through a side slot 98. A rear crimp ring 104 and a crimp sleeve 106 allow crimping of a cable 150 to holder 96.

A clip 180 may be used to hold connector portions 12 in the desired position. If an alternative position of connectors 12 is desired, such as to reverse the polarity of the connector portions 12, clip 180 is removed, thereby allowing rotation of the front housings 32 with the latches to an opposite side of connector 10. Such operation is desirable to change the polarity of connector portions 12 with respect to boot 14. Once the front housings 32 are rotated, clip 180 is repositioned to maintain the front housings 32 in the new desired position. Boot 14 includes similar slots 52 on an opposite side of boot 14 so that boot 14 does not need to be rotated. Clip 180 can also be provided with different dimensions so as to change the spacing between connector portions 12, if desired.

In the illustrated example, front housing 32 mounts to ferrule assembly 76. Ferrule assembly 76 mounts to holder 96. Holder 96, which mounts to two ferrule assemblies 76, mounts to boot 14. Boot 14 is engageable with latches 18 of the front housings 32. Cable 150 is crimped to holder 96. The individual fibers of cable 150 are fixed to the ferrules 78, such as with epoxy.

Cable 150 includes an outer jacket 152, strength members 154, typically in the form of an aramid yarn, and two fibers 156, 158. Each fiber 156, 158 includes an outer coating and a bare fiber. Typically, the coating is removed and the bare fiber is inserted into the ferrule 78, and affixed, such as with epoxy.

Front housing 32 includes a key 34 for mating with an inner passage of adapter. Front housing 32 includes latch 18 on an exterior, and an inner passage 36 in the interior for receiving ferrule assembly 76. Inner passage 36 includes a front shoulder, an inner slot and a side slot.

Boot 14 includes an opening for mating with structure on holder 96. Boot 14 includes an interior area, and a flexible rear portion.

As additionally detailed at FIGS. 11-18, holder 96 includes a structure 100 for mating with structure on rear sleeve 90 of ferrule assembly 76. Holder 96 includes a rear projection 102 for receiving the crimp ring 104 and the crimp sleeve 106. Holder 96 includes cross slots 108 for receiving the proximal ends of latch 18. A shoulder 110 mates with opening 54 of boot 14 to allow longitudinal movement of boot 14 relative to holder 96. Side slots 98 lead to openings 112. Openings 112 allow for lateral movement of connector portions 12 to vary the lateral spacing. Openings 112 clip over ferrule assemblies 76 to retain the assemblies with holder 96.

Holder 96 is provided with a lateral slot 114, and a rear stop 115 for mating with rear sleeve 90 of each ferrule assembly 76.

The front sleeve 88 of ferrule assembly 76 includes a keyed surface for mating with a keyed surface 116 of hub 80.

The inner surface of the front sleeve 88 is press fit onto the outer surface of rear sleeve 90. Rear sleeve 90 defines an inner passage.

To assemble connector 10, cable 150 is inserted through boot 14, crimp ring 104 and crimp sleeve 106. The fibers 156, 158 are affixed to the ferrules 78 of the ferrule assemblies 76. The ferrule assemblies 76 with the front housings 32 attached are mounted to the holder 96. The cable jacket 152 and strength members 154 are crimped to rear projection 102 between crimp ring 104 and crimp sleeve 106. Although crimp sleeve 106 is optional is some implementations. Boot 14 is pulled over holder 96 until shoulder 110 of holder 96 is retained in opening 54 of boot 14, and the proximal ends of the latches 18 are in one of slots 50, 52 of boot 14.

To switch polarity of connector portions 12, the front housings 32 are rotated in opposite directions so that the proximal ends 22 of the latches 18 are moved between slots 50, 52. During polarity switching, boot 14 remains mounted to housing 96. Clip 180 is removed during the polarity switching operation.

Front housings 32 with latches 18 can each be made as a one-piece element. Front housing 32 defines an LC profile for mating with ports 210 of adapter 200. As noted, front housings 32 are rotatable about the longitudinal axis of each connector portion 12 to change the polarity of the connector 10, without rotating the ferrule 78 or the ferrule assembly 76.

While the example connector 10 includes two fiber optic connector portions 12 and a boot 14, it is to be appreciated that connector 10 can include a single connector portion 12.

In some examples, clip 180 is not used. Clip 180 can be used to provide a certain spacing of connector portions 12. A different clip 180 with a different spacing may be used, or the clip may be not used for the closer spacing.

Boot 14 is shown as including a spring return feature. The holder 96 can be configured to receive a spring holder 142 including a peg. Spring holder 142 with the peg holds a return spring 146. Spring 146 biases boot 14 toward the forward position when released by the user. When the user pulls boot 14 longitudinally away from the connector portions 12, the spring 146 is compressed. Spring 146 moves the boot 14 back to the rest position upon release by the user.

Fixture 200

Referring to FIGS. 1-10, a fixture 200 is presented. Fixture 200 is for retaining the holder 96 and fiber optic cable 150 such that the jacket and outer coating of the optical fibers 156, 158 can be stripped within a standard optical fiber stripping machine, such as a Sumitomo JR type Hot Jacket Remover or a Fujikura HJS type Hot Jacket Stripper.

As shown, fixture 200 is formed with a main body 202 to which an operable door 204 is rotatably attached. In one example, the main body 202 is formed from a polymeric material, such as polyetherimide (Ultem®). In one example, the main body 202 is a molded polymeric material, such as an injection molded plastic part. In one example, the main body 202 is a single body with all described features for the main body 202 being integrally formed as a single component. The main body 202 defines a top surface 202a, a first end 202b, a second end 202c, a bottom surface 202d, and side surfaces 202e, 202f.

Figure 19:
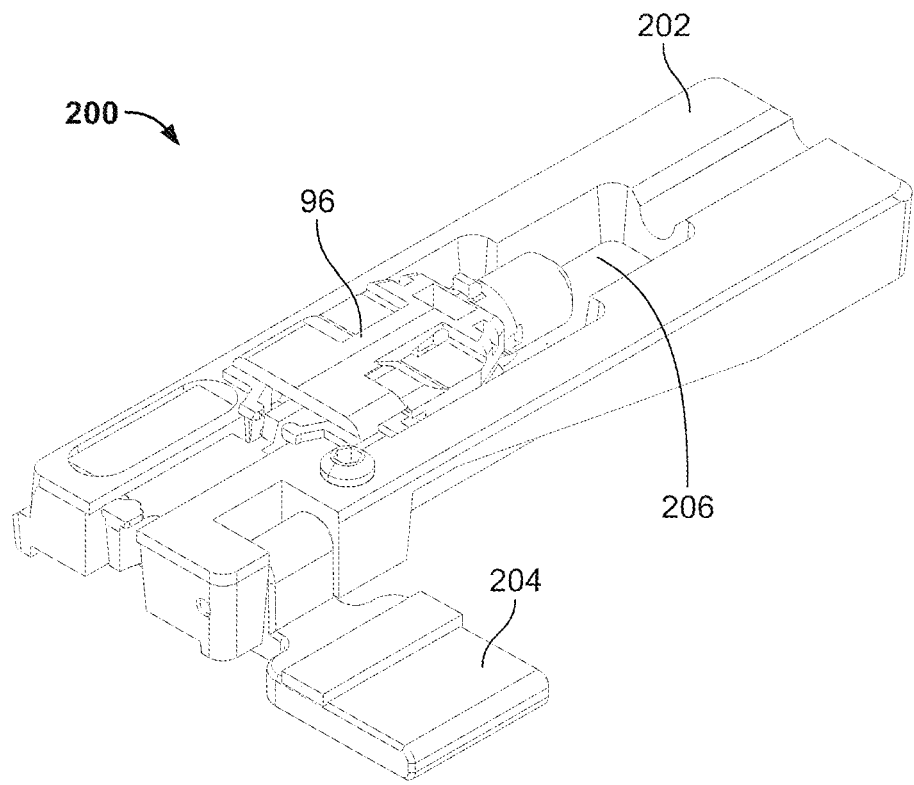
FIG. 19 is a front perspective view of the fixture shown in FIG. 1 with the holder shown in FIG. 11 installed.
Figure 20:
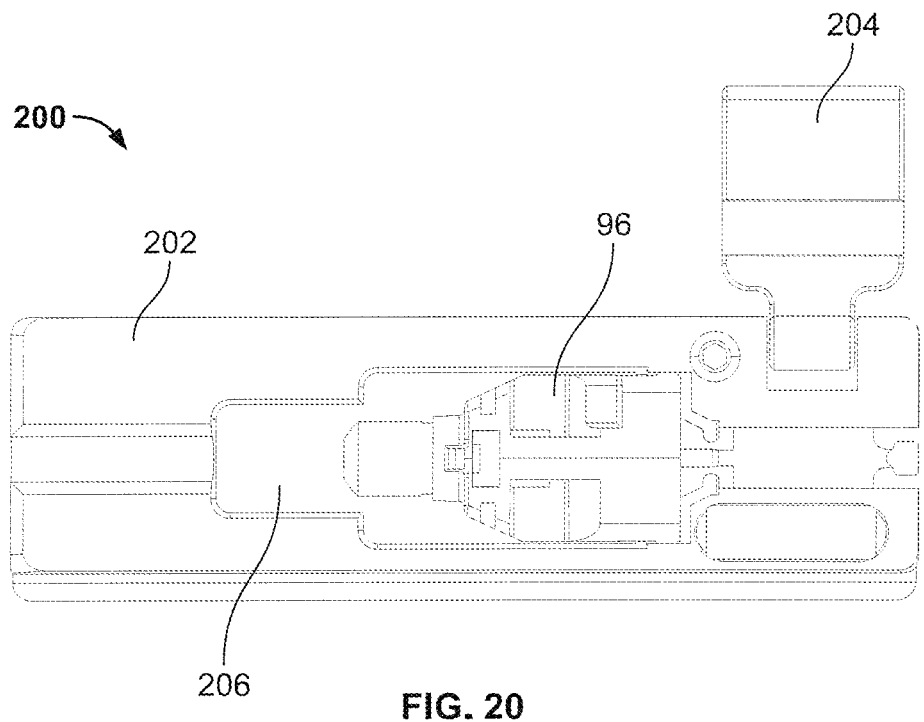
FIG. 20 is a top view of the fixture and holder shown in FIG. 19.
Figure 21:
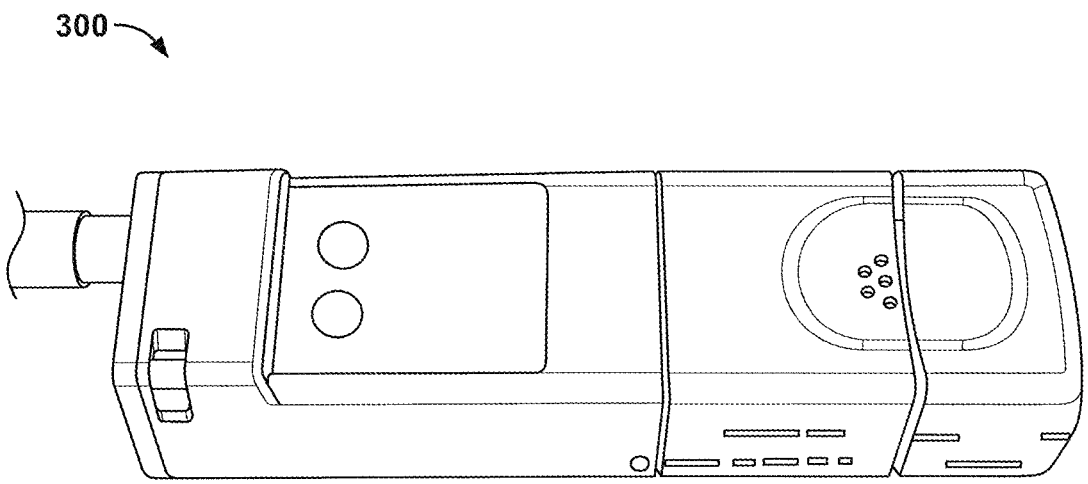
FIG. 21 is an image of a fiber optic stripping machine in a closed position.
Figure 22:
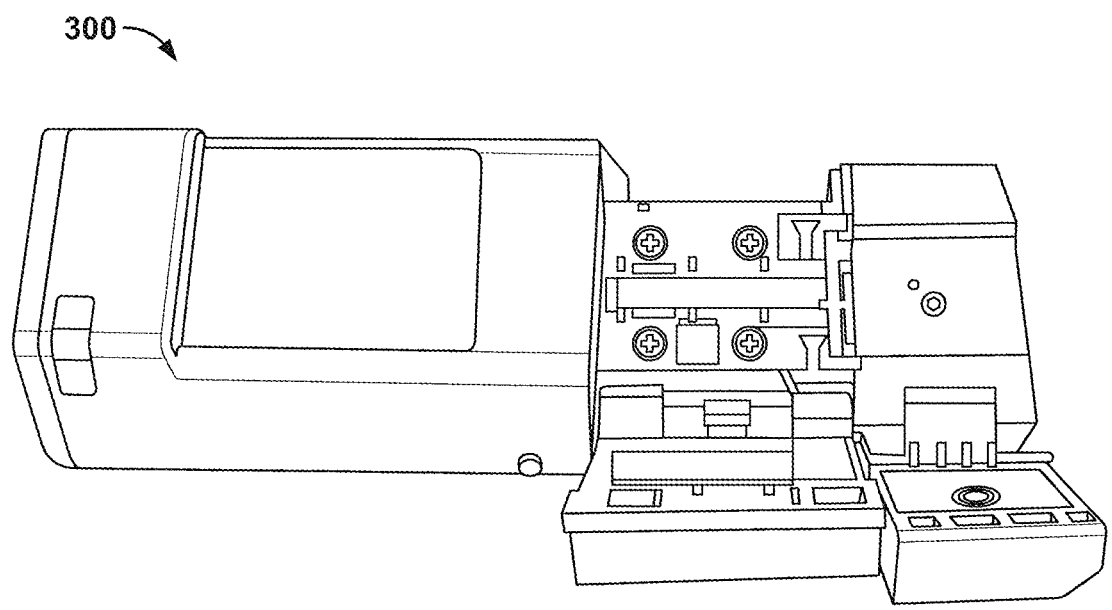
FIG. 22 is an image of the fiber optic stripping machine shown in FIG. 21 in an open position.
Figure 23:
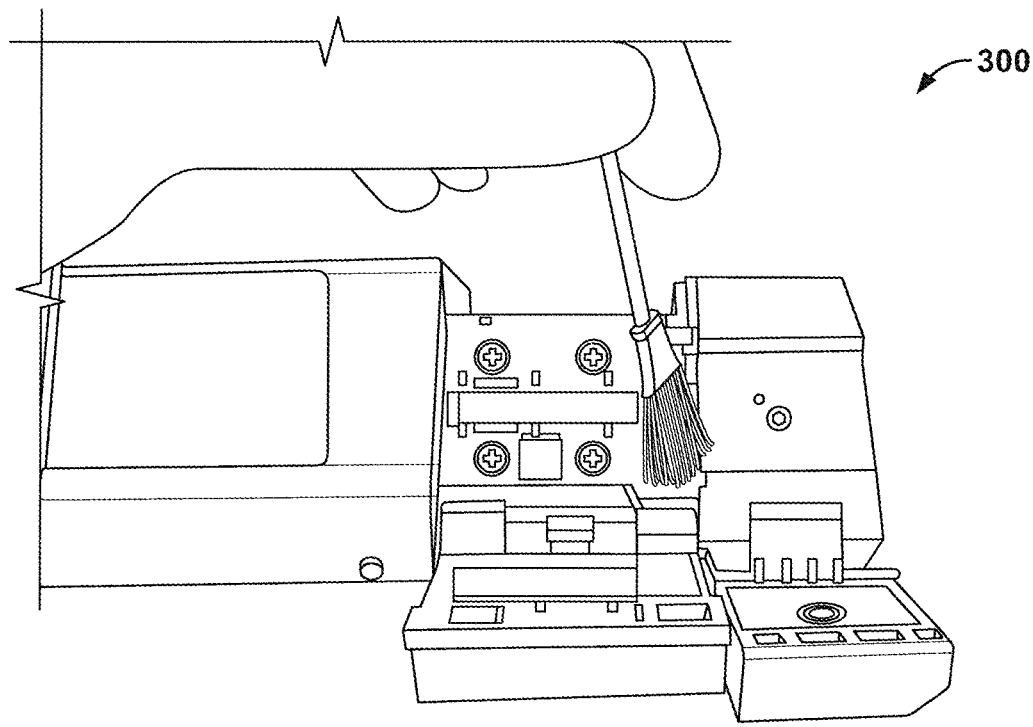
FIG. 23 shows an image of a brush cleaning blades of the fiber optic stripping machine shown in FIG. 21.
Figure 24:
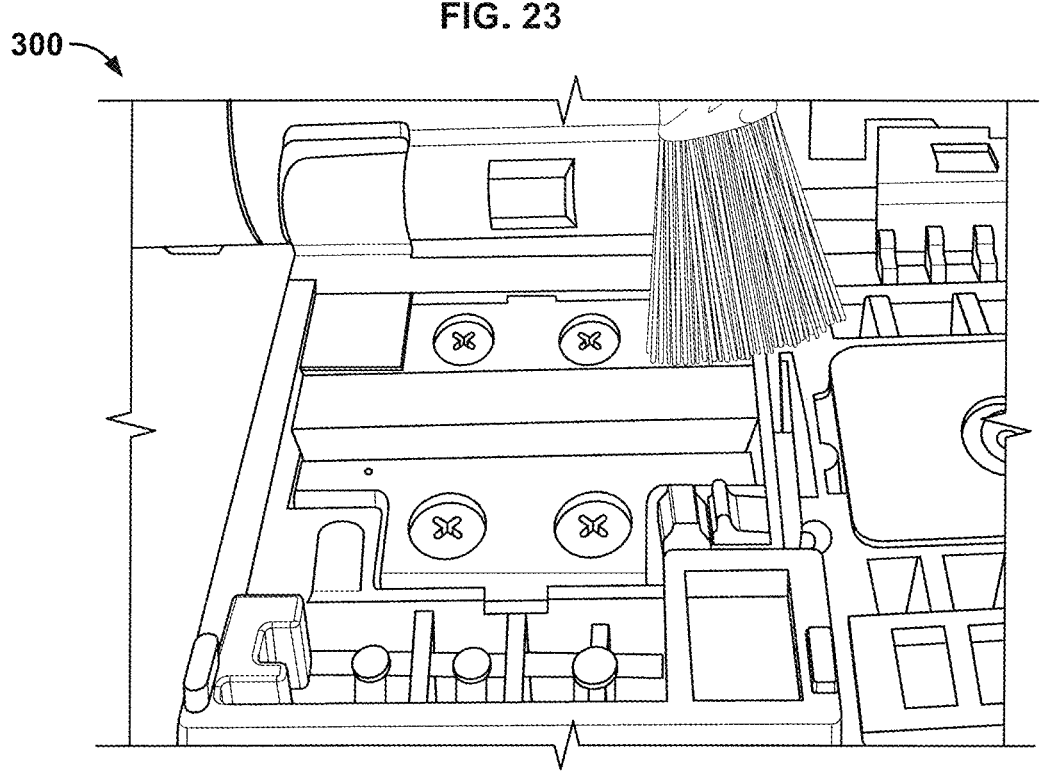
FIG. 24 shows an enlarged view of the fiber optic stripping machine and brush shown in FIG. 23.

In one aspect, the main body 202 defines a cavity 206 with a first portion 206a, a second portion 206b, a third portion 206c, and a fourth portion 206d. When the holder 96 is in a rearward position within the cavity 206, the first cavity portion 206a receives the cable 150, the second cavity portion 206b receives the holder rear projection 102, the third cavity portion 206c receives the holder 96, and the fourth cavity portion 206d receives the optical fibers 156, 158. When the holder 96 is moved to a forward position within the cavity, the majority of the rear projection 102 is disposed within the third cavity portion 206c along with the main body of the holder 96. FIGS. 19 and 20 show the holder 96 received within the third cavity portion 206c with the holder 96 being in the forward position. In one aspect, the first cavity portion 206a is narrower than the second cavity portion 206b, which is in turn narrower than the third cavity portion 206c. In one aspect, the third cavity portion 206c is provided with a width w1 that is only slightly larger than the overall width of the holder 96 such that the holder 96 can be constrained from moving laterally once placed in the third cavity portion 206c. The third cavity portion 206c is also shown as being provided with a recess 206e for receiving portions of the boot 14. The third cavity portion 206c is also shown as being provided with a slot-shape aperture 206f extending through the main body 202. In the example shown, the aperture 206f is a relief for molding purposes.

In one aspect, the door 204 is secured to the main body 202 via a hinge pin 208 extending through a cavity in the main body 202 which is in turn secured by a fastener 210. The door is movable between an open position, as shown in the drawings, to a closed positon in which the door 204 covers part of the top surface 202a of the main body 202 and a portion of the fourth cavity portion 206d. Where the door 2004 is formed from a ferromagnetic material (e.g. steel), the door 204 can be retained in the closed position by a magnet 212 housed within a recess 214 of the main body 202. When the door 204 is in the closed position, the door 204 retains the fibers 156, 158 extending from the holder 96 within the fourth cavity 206d during the stripping process, as described below.

Figure 31:
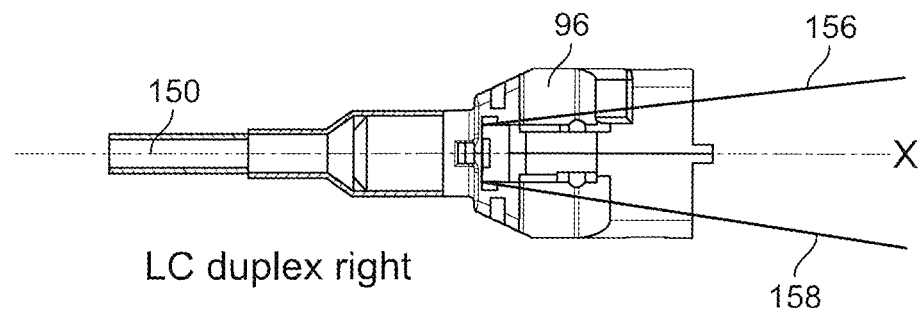
FIG. 31 is a top view of the holder shown in FIG. 1 with optical fibers secured within the holder and extending at an oblique angle to the longitudinal axis of the holder.

In one aspect, the fixture main body 202 is provided with a first fiber retaining structure 216 and a second fiber retaining structure 218. The first and second fiber retaining structures 216, 218 retain and guide each of the fibers 156, 158 within the fourth cavity portion 206d such that the fibers 156, 158 extend beyond the end 202b of the main body 202 at a desired orientation such that the fibers can be appropriately stripped by the fiber stripping machine. In one example, the desired orientation is a direction that is parallel to the longitudinal axis X of the main body 202, wherein the fibers 156, 158 are spaced apart from each other. The first and second fiber retaining structures 216, 218 also ensure that the fibers 156, 158 are held at the appropriate height within the fiber stripping machine. With reference to FIG. 31, it can be seen that the fibers 156, 158 naturally extend at an oblique angle to the axis X when unconstrained. This orientation of the fibers 156, 158 is undesirable when the fibers 156, 158 must be stripped within the stripping machine 300, as the stripping machine 300 requires that the fibers 156, 158 be aligned in a spaced apart, parallel relationship and also aligned parallel with the longitudinal axis (e.g. axis X) of the stripping machine 300. As the fixture 200 places the fibers 156, 158 to be stripped in an acceptable orientation for a standard stripping machine 300, the necessity for the use of specialized equipment and/or processes can be avoided.

In one aspect, the first and second fiber retaining structures 216, 218 are located at opposite ends of the fourth cavity portion 206d with the first fiber retaining structure 216 being located at the juncture of the third and fourth cavity portions 206c, 206d and the second fiber retaining structure 218 being located at the opposite end of the fourth cavity portion 206d adjacent the end 202b of the main body 202.

Figure 1:
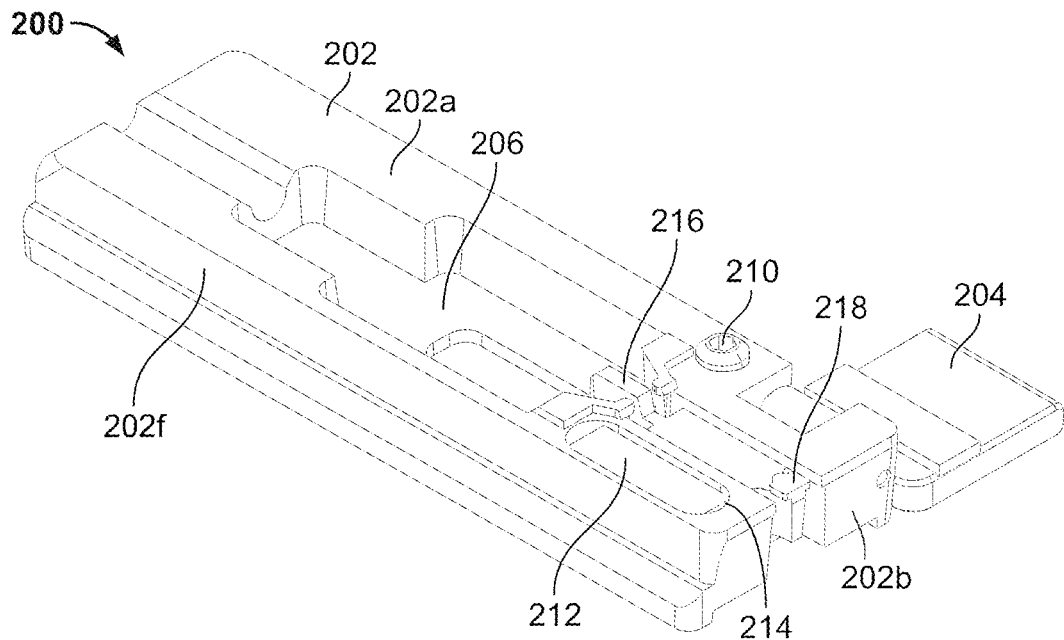
FIG. 1 is a front perspective view of a fixture for retaining a fiber optic connector holder and fiber optic cable in accordance with aspects of the present invention.
Figure 2:
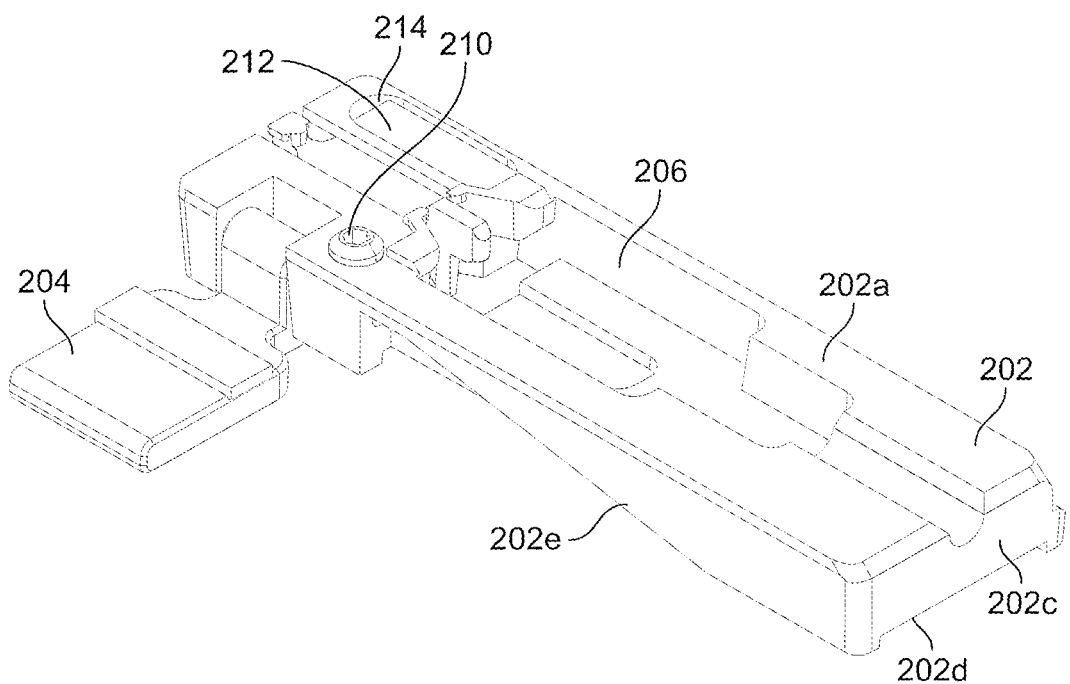
FIG. 2 is a rear perspective view of the fixture shown in FIG. 1.
Figure 3:
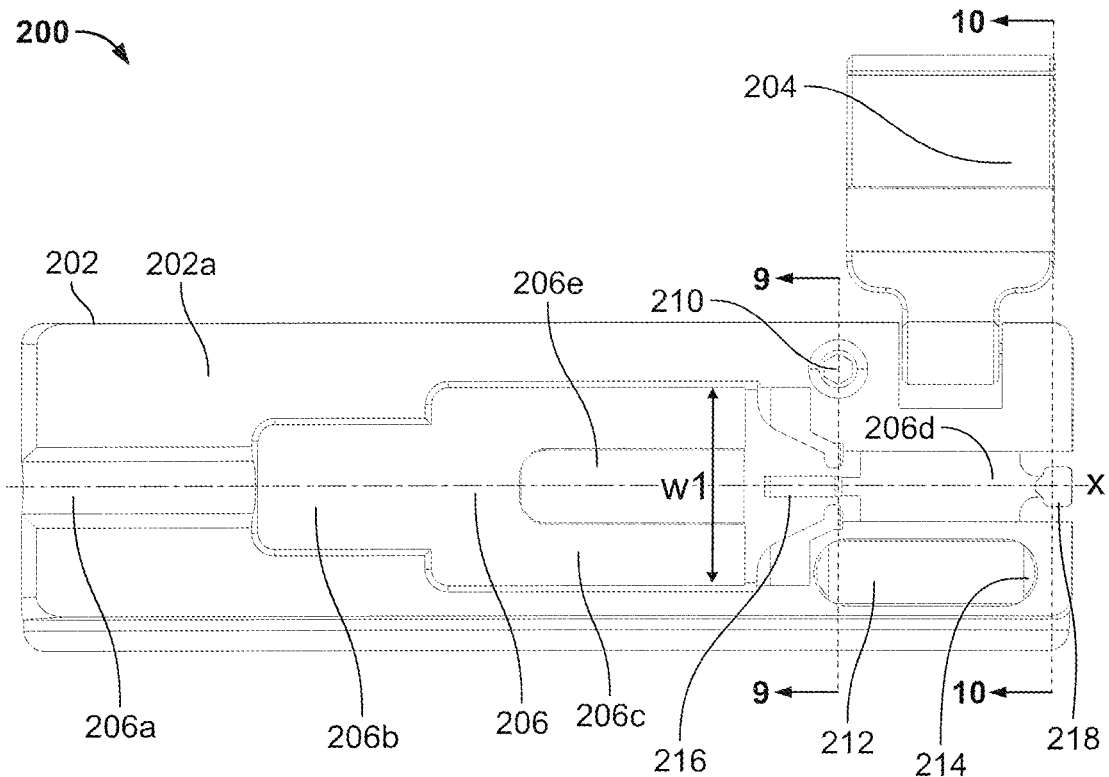
FIG. 3 is a top view of the fixture shown in FIG. 1.
Figure 4:
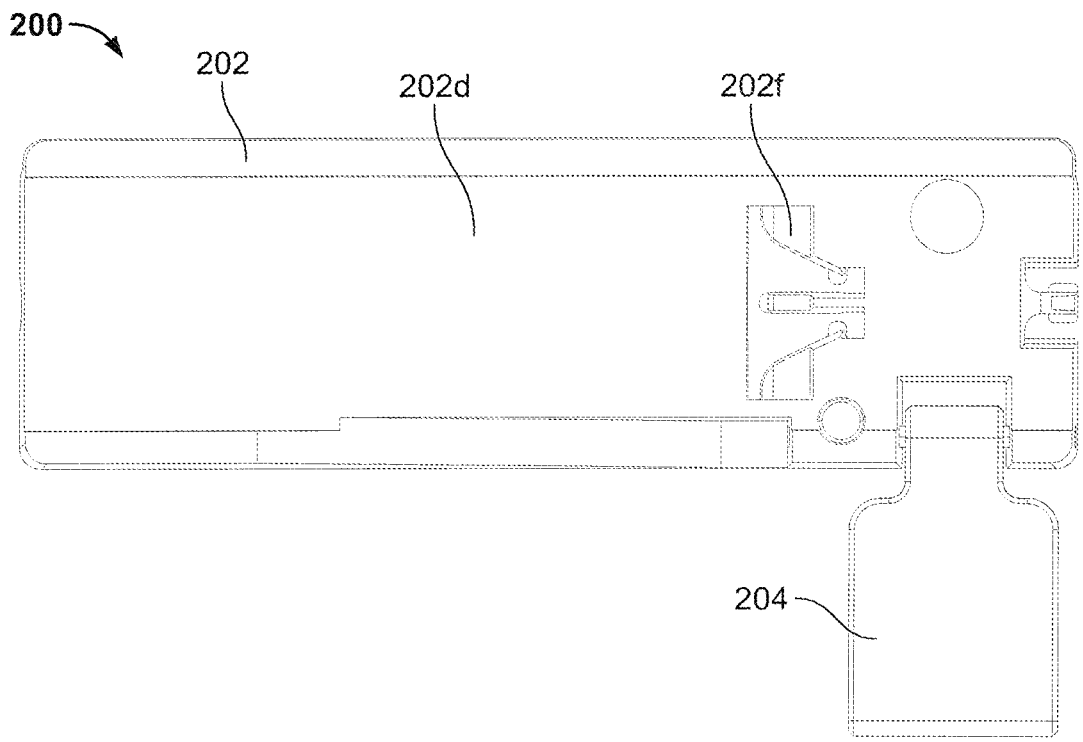
FIG. 4 is a bottom view of the fixture shown in FIG. 1.
Figure 5:
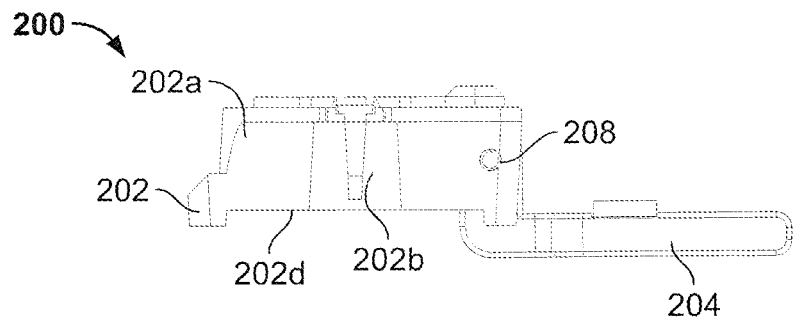
FIG. 5 is a first end view of the fixture shown in FIG. 1.
Figure 6:
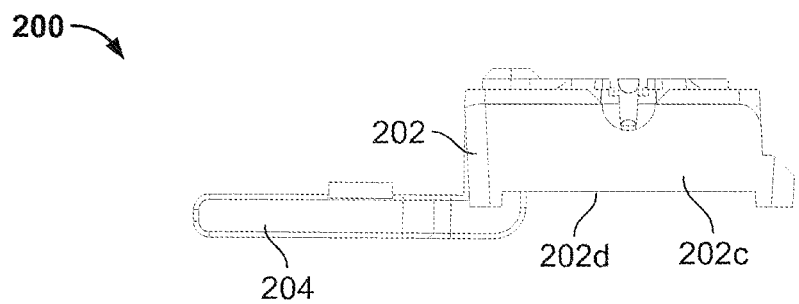
FIG. 6 is a second end view of the fixture shown in FIG. 1.
Figure 7:
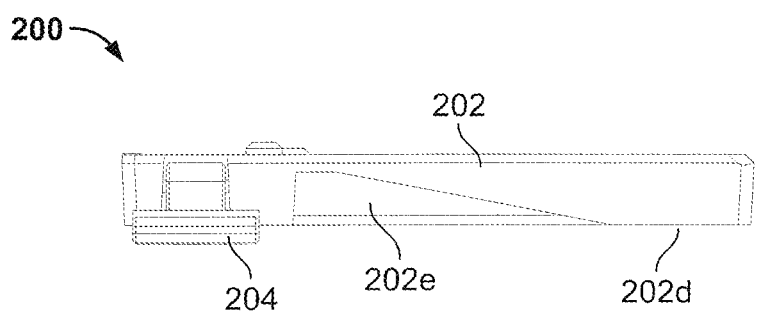
FIG. 7 is a first side view of the fixture shown in FIG. 1.
Figure 8:
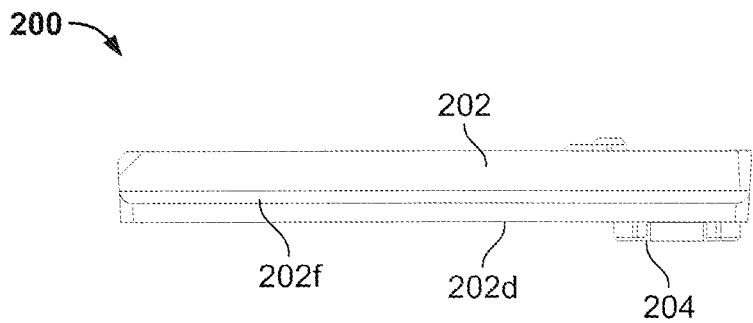
FIG. 8 is a second side view of the fixture shown in FIG. 1.
Figure 9:
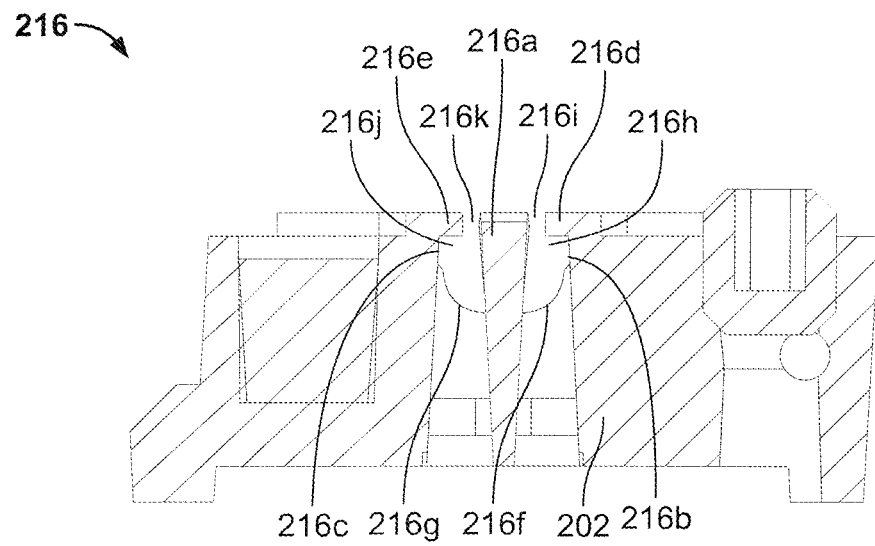
FIG. 9 is a cross-sectional view of the fixture shown in FIG. 1, taken along the line 9-9 at FIG. 3.

As most easily seen at FIG. 9, the first fiber retaining structure 216 includes a central member 216a, a first sidewall 216b, a second sidewall 216c, a first overhang portion 216d, and a second overhang portion 216e, a first bottom wall 216f, and a second bottom wall 216g. The central member 216a, first sidewall 216b, first overhang portion 216d, and first bottom wall 216f define a first guide channel 216h which can be accessed through an opening 216i defined by the first overhang portion 216d and the central member 216a. Similarly, the central member 216a, second sidewall 216c, second overhang portion 216e, and second bottom wall 216g define a second guide channel 216j which can be accessed through an opening 216k defined by the second overhang portion 216e and the central member 216a. Thus, when the holder 96 and fibers 156, 158 are placed in the fixture 200, the fiber 156 can be inserted through the opening 216i and routed through the first guide channel 216h while the fiber 158 can be inserted through the opening 216k and routed through the second guide channel 216j.

Figure 10:
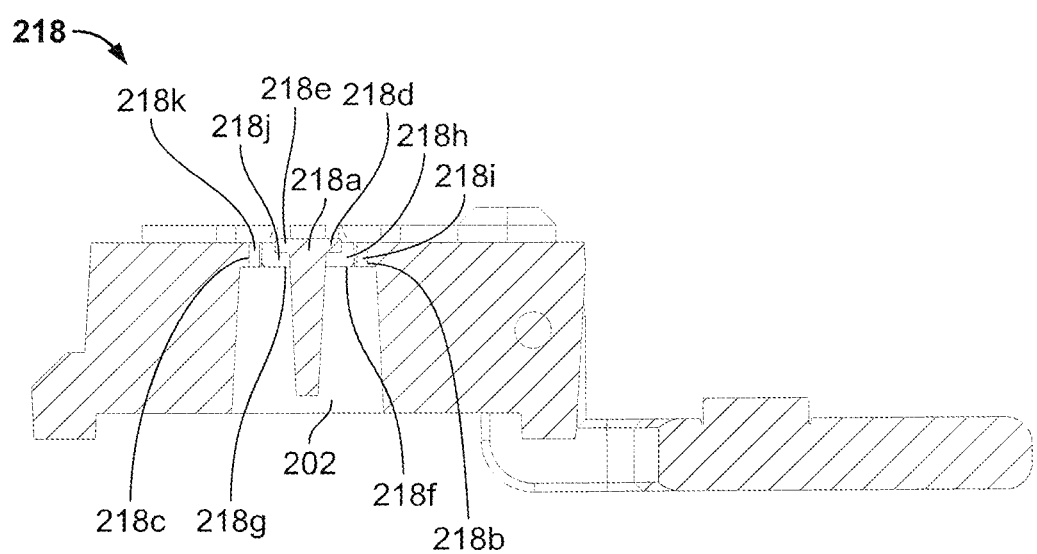
FIG. 10 is a cross-sectional view of the fixture shown in FIG. 1, taken along the line 10-10 at FIG. 3.
Figure 11:
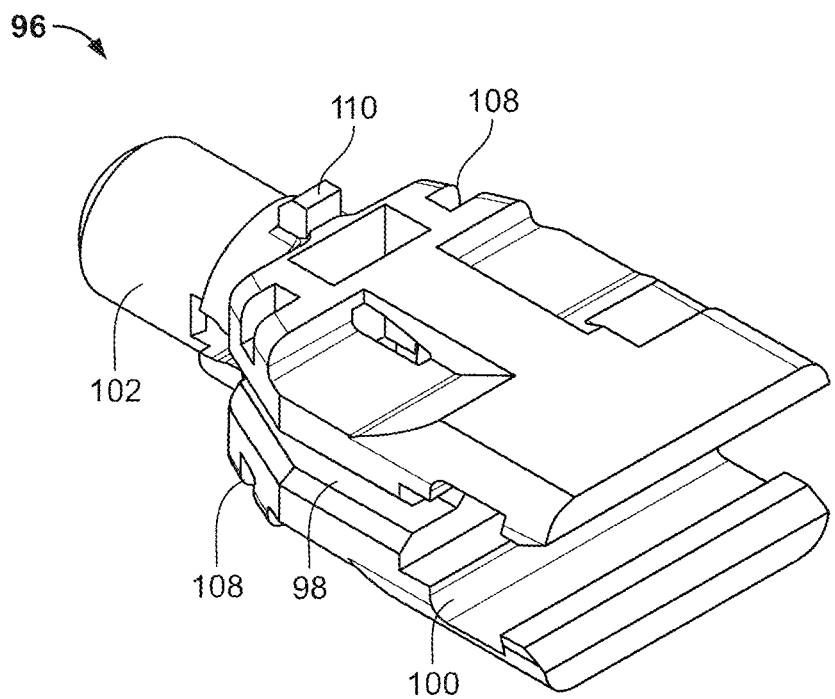
FIG. 11 is a front perspective view of a holder of a connector usable with the fixture shown in FIG. 1.
Figure 12:
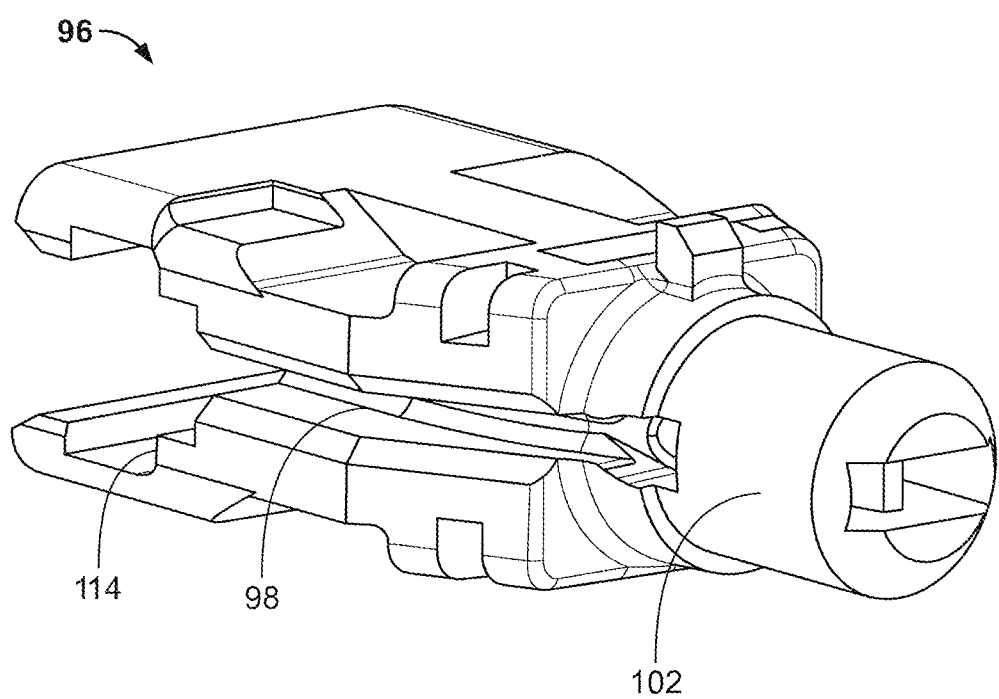
FIG. 12 is a rear perspective view of the holder shown in FIG. 11.
Figure 13:
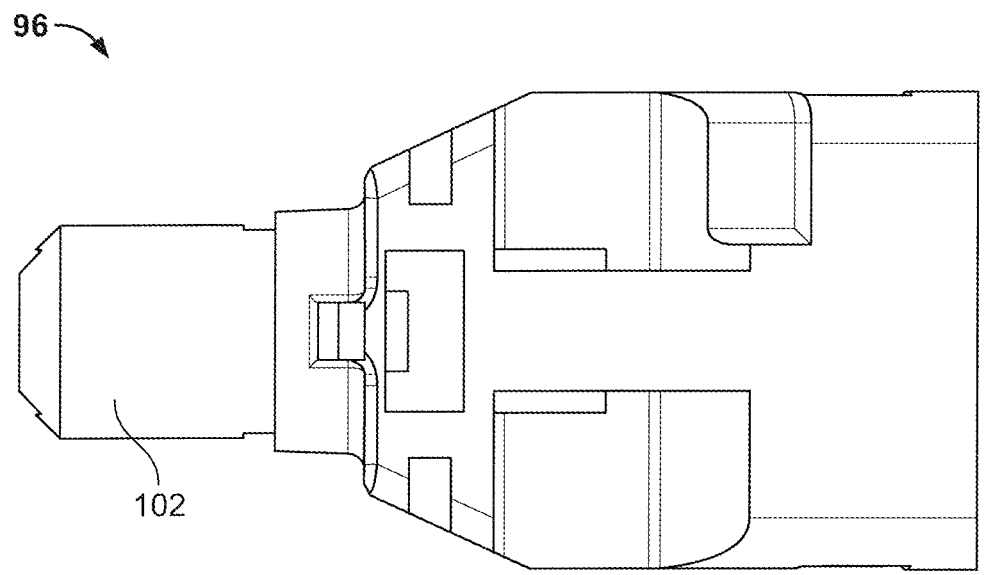
FIG. 13 is a top view of the holder shown in FIG. 11.
Figure 14:
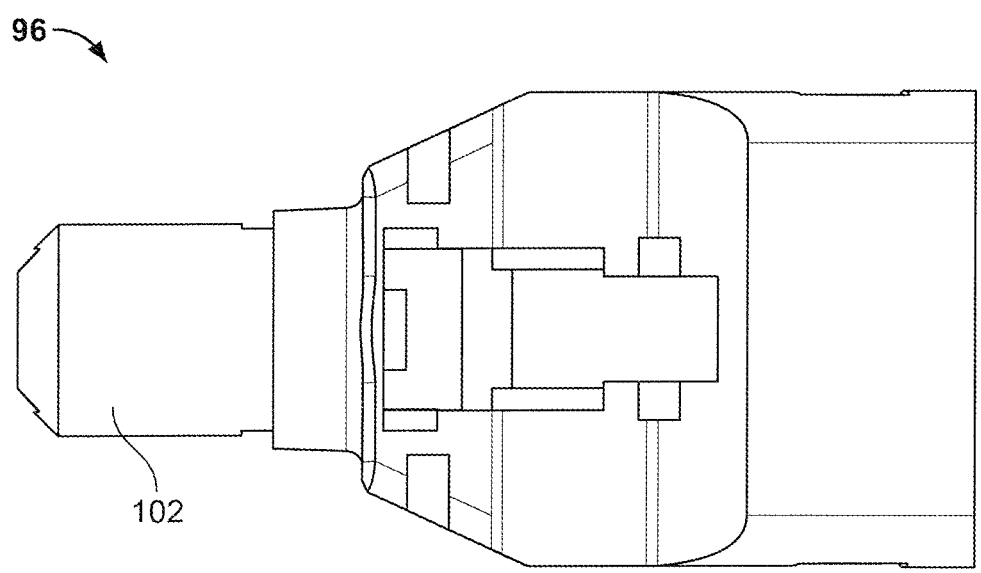
FIG. 14 is a bottom view of the holder shown in FIG. 11.
Figure 15:
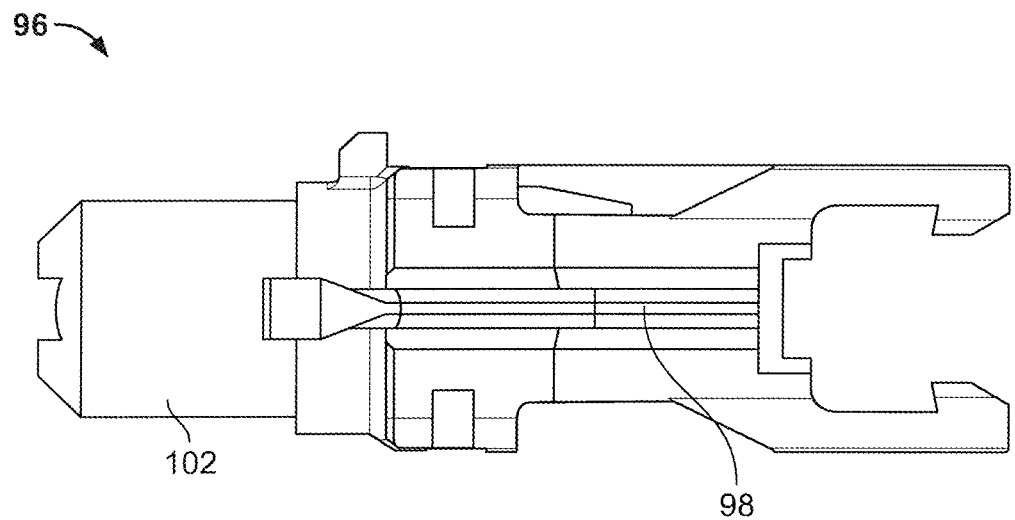
FIG. 15 is a first side view of the holder shown in FIG. 11.
Figure 16:
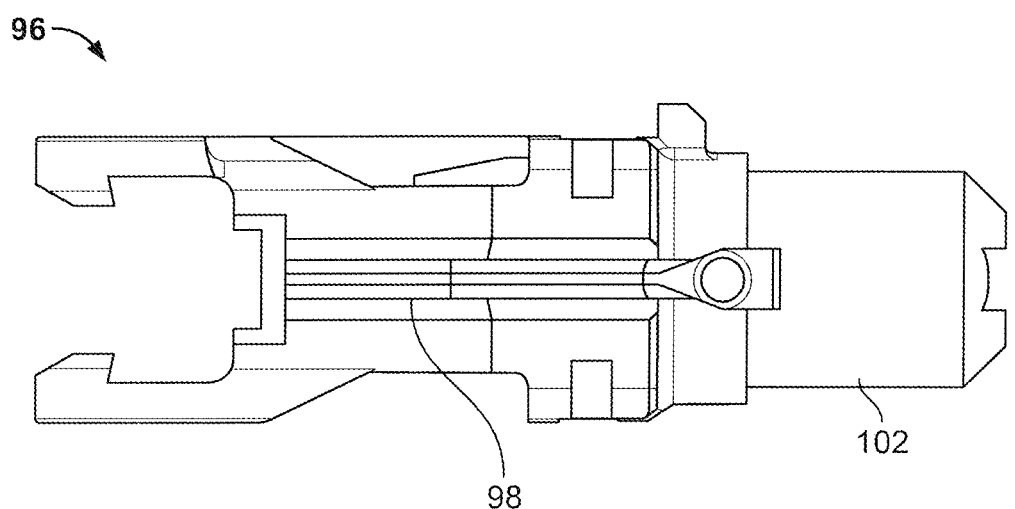
FIG. 16 is a second side view of the holder shown in FIG. 11.
Figure 17:
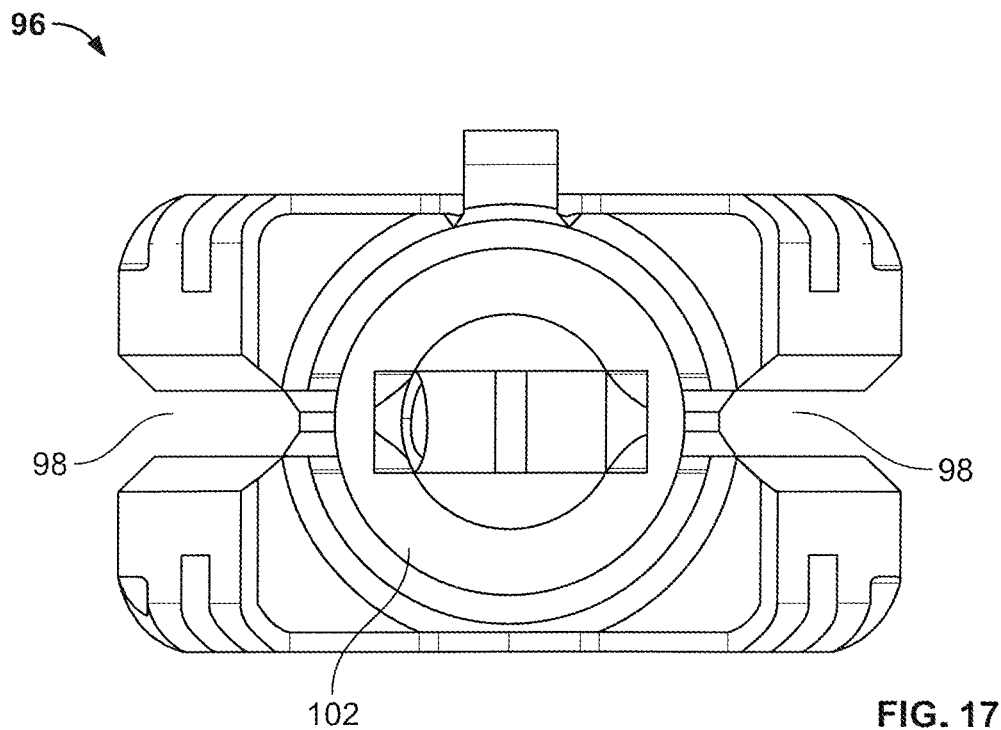
FIG. 17 is a rear view of the holder shown in FIG. 11.
Figure 18:
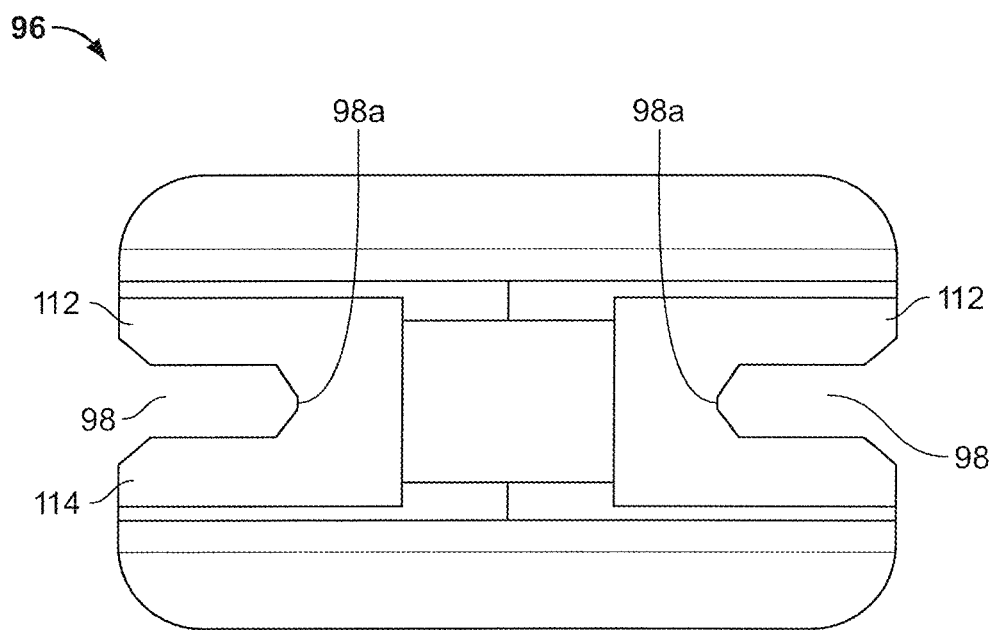
FIG. 18 is a front view of the holder shown in FIG. 11.

As most easily seen at FIG. 10, the second fiber retaining structure 218 includes a central member 218a, a first sidewall 218b, a second sidewall 218c, a first overhang portion 218d, and a second overhang portion 218e, a first bottom wall 218f, and a second bottom wall 218g. The central member 218a, first sidewall 218b, first overhang portion 218d, and first bottom wall 218f define a first guide channel 218h which can be accessed through an opening 218i defined by the first overhang portion 218d and the central member 218a. Similarly, the central member 218a, second sidewall 218c, second overhang portion 218e, and second bottom wall 218g define a second guide channel 218j which can be accessed through an opening 218k defined by the second overhang portion 218e and the central member 218a. Thus, when the holder 96 and fibers 156, 158 are placed in the fixture 200, the fiber 156 can be inserted through the opening 218i and routed through the first guide channel 218h while the fiber 158 can be inserted through the opening 218k and routed through the second guide channel 218j.

Fiber Stripping Process 1000

Figure 25:
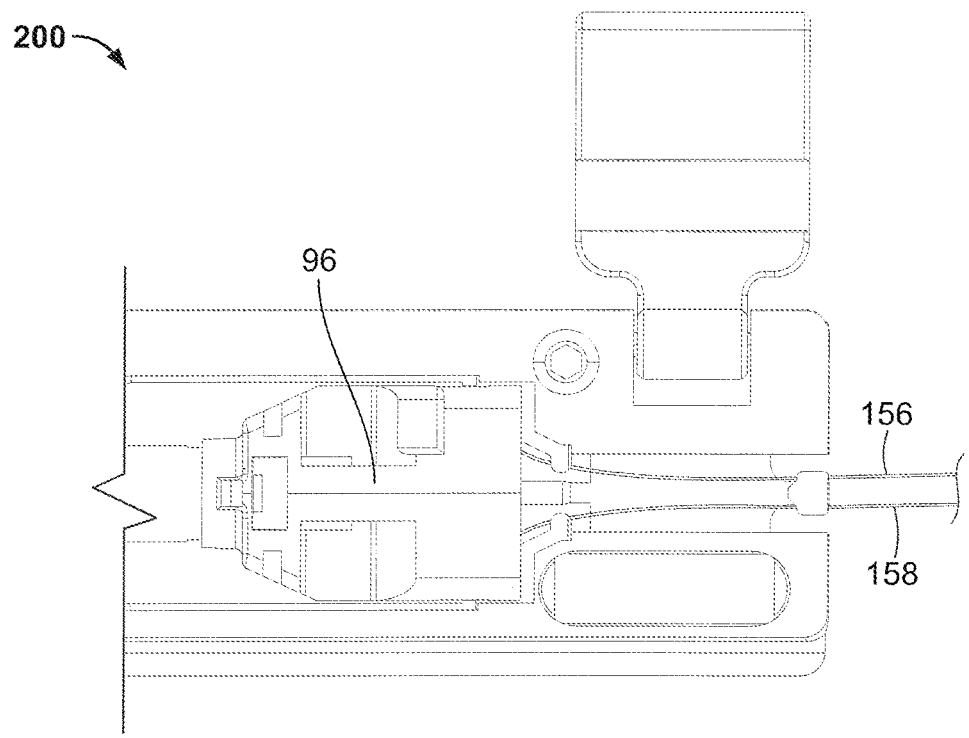
FIG. 25 shows images of the fixture of FIG. 1 and holder of FIG. 11 with optical fibers extending from the holder and into the fixture.
Figure 26:
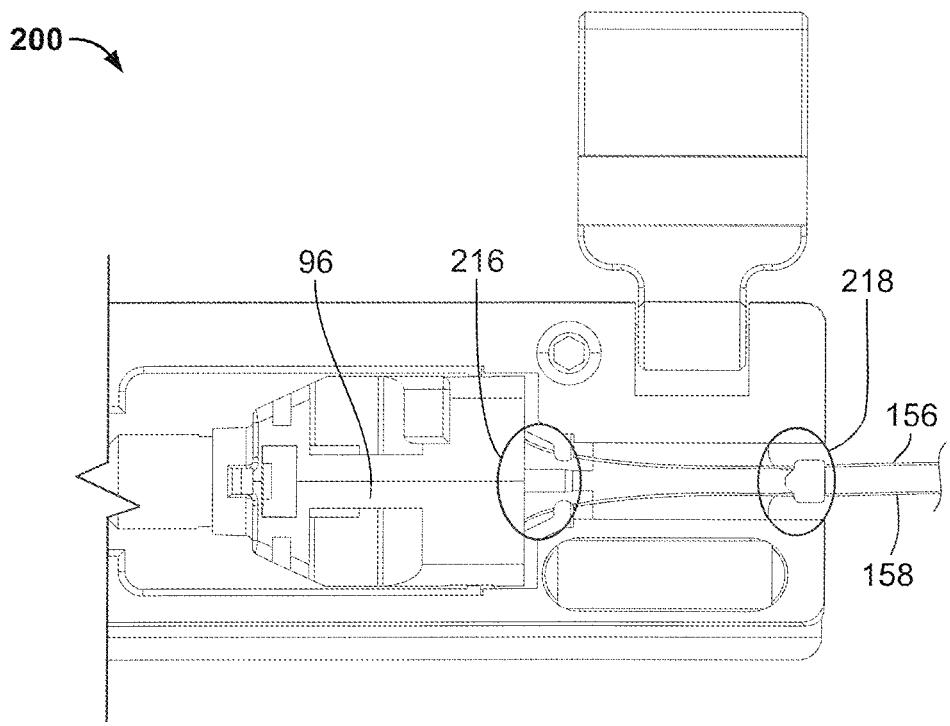
FIG. 26 shows an image of an enlarged view of the fixture and holder shown in FIG. 25.

Referring to FIGS. 21 to 31, a fiber stripping process 1000 is illustrated. At FIG. 21, a fiber stripping machine 300 is shown. At FIG. 22, a step of opening the access door of the fiber stripping machine 300 is illustrated. At FIGS. 23 and 24, the upper and lower blades of the fiber stripping machine 300 are cleaned with a brush. At FIG. 25 shows the holder 96 and fibers 156, 158 being installed into the fixture 200. FIG. 26 illustrates how the fibers 156, 158, which naturally extend at an angle away from the longitudinal axis X, are bent inward by the sidewalls 216b, 216c of the first fiber retaining structure 216 such that the fibers 156, 158 are secured beneath the overhang portions 216d, 216e. FIG. 26 also highlights how the fibers 156, 158, which now have an inward bent due to the forces exerted by the first fiber retaining structure 216 on the fibers 156, 158, are then held apart by the central member 218a of the second retaining structure 218 such that the fibers 156, 158 are secured beneath overhang portions 218d, 218e. It is noted that the distance between the inner walls 98a defining the side slots 98 of the holder 96a is greater than the distance between the sidewalls 216b, 216c. As the fibers 156, 158 transition from the side slots 98 to the sidewalls 216b, 216c, this reduced distance forces the fibers 156, 158 inward such that they then press against the central member 218a of the second retaining structure 218. This arrangement allows for the portion of the fibers 156, 158 extending beyond the end 202b of the fixture main body 202 to be suitably oriented in a spaced apart, parallel relationship that is also parallel to the longitudinal axis X such that the fibers 156, 158 are aligned orthogonally to the blades of the fiber stripping machine 300.

Figure 27:
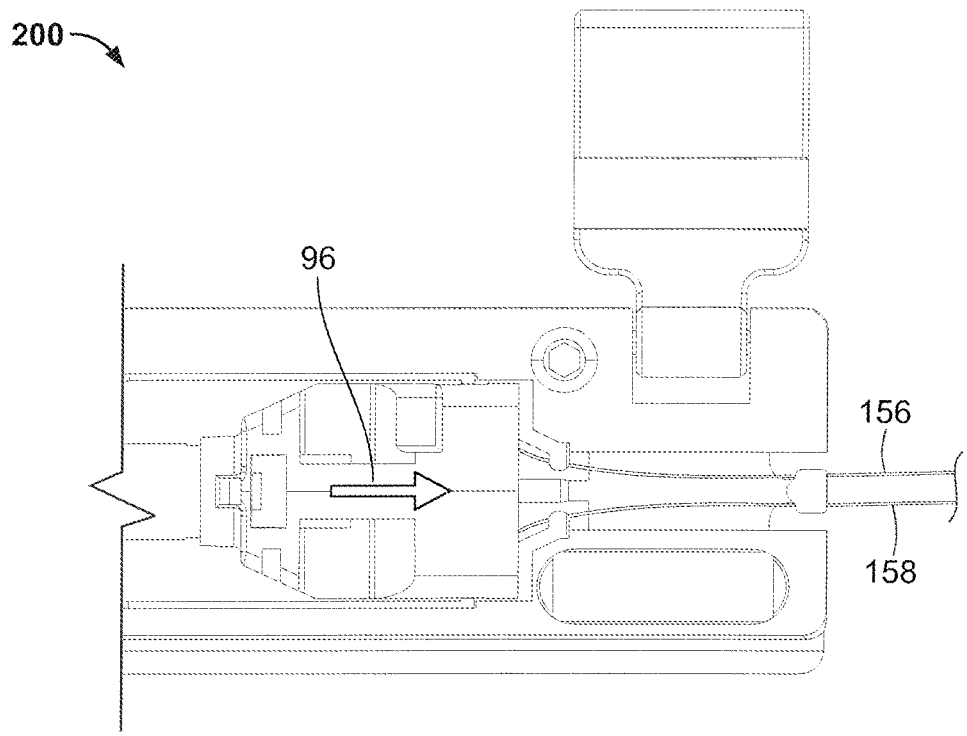
FIG. 27 shows an image of the fixture of FIG. 1 and holder of FIG. 11 with the holder placed in a forward position.
Figure 28:
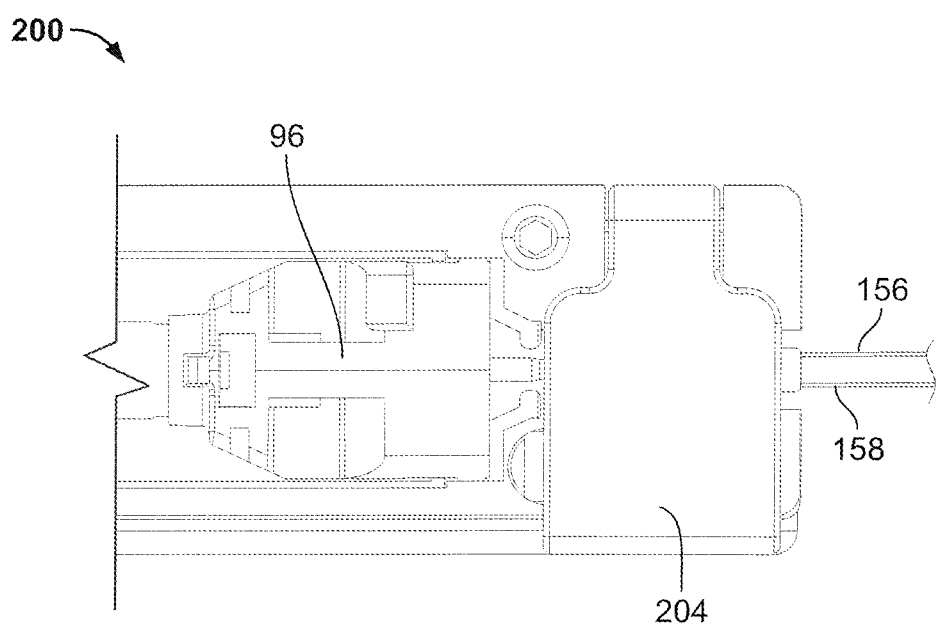
FIG. 28 shows an image of the fixture of FIG. 1 and holder of FIG. 11 with the door of the fixture placed in a closed position.
Figure 29:
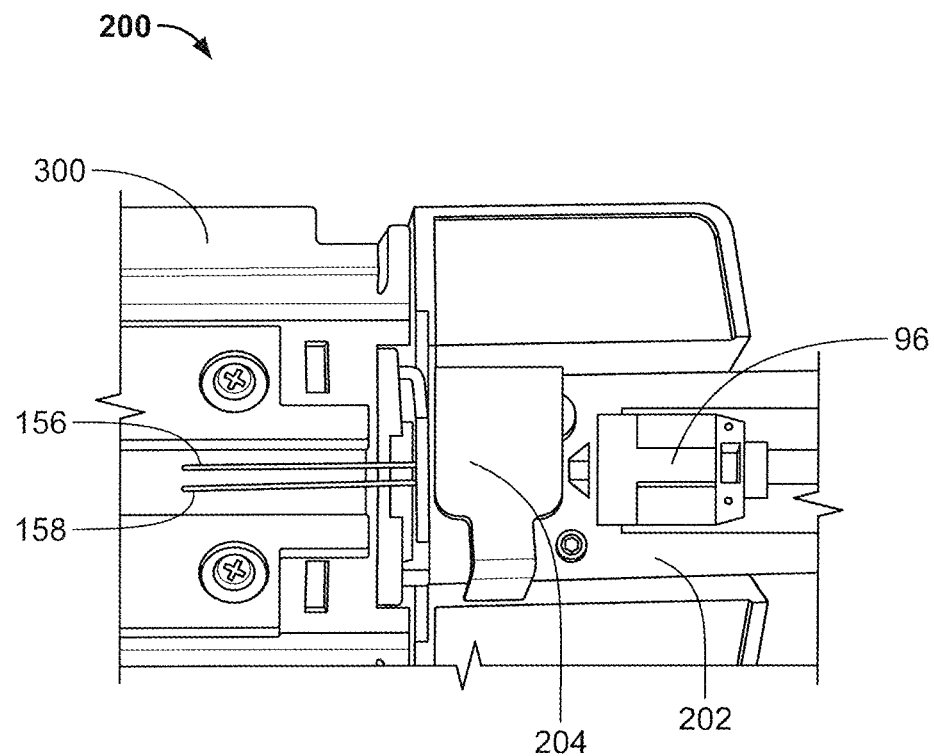
FIG. 29 shows an image of the fixture of FIG. 1 installed within the fiber optic stripping machine shown in FIG. 21 with the access door in an open position.
Figure 30:
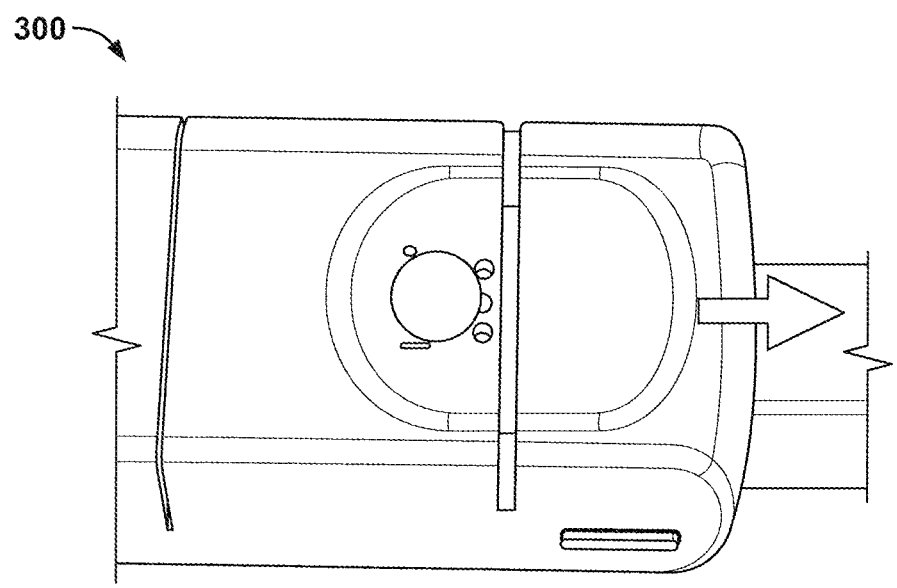
FIG. 30 shows an image of the fixture of FIG. 1 installed within the fiber optic stripping machine shown in FIG. 21 with the access door in a closed position.

FIG. 27 shows the holder 96 being slid into the forward position such that a front edge of the holder 96 abuts the end of the third cavity portion 206c proximate the first fiber retaining structure 216. FIG. 28 shows the door 204 being moved into the closed position such that the fibers 156, 158 are securely retained within the fourth cavity portion 206d. At this stage, the fixture 200 is now ready to be placed into the fiber stripping machine 300, which is shown at FIG. 28. At FIG. 30, the access door of the fiber stripping machine 300 is shown as being in the closed position, whereby the machine 300 can be operated to strip the fibers 156, 158 with the upper and lower blades. Once the machine 300 finishes the stripping operation, the fixture 200 can be removed from the machine 300 and the holder 96 and stripped fibers 156, 158 can be removed from the fixture 200. The connector 10 can then be fully assembled, as described in PCT Patent Application Publication WO 2015/103783.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fixture for retaining an optical connector holder and optical fibers for splicing in an optical fiber stripping machine, the fixture comprising:
    a) a main body extending between a first end and a second end;
    b) a cavity defined within the main body, the cavity configured for receiving an optical cable holder of an optical fiber connector; and
    c) a first fiber retention structure for holding the optical fibers extending from the connector holder, the first fiber retention structure including a pair of channel structures separated by a central member and being defined by a pair of sidewalls each of which includes an overhang portion extending over one of the channel structures.

2. The fixture of claim 1, wherein the cavity extends from the first end to the second end of the main body.

3. The fixture of claim 1, wherein the fixture additionally includes a door operable between an open position and a closed position, wherein when the door is in the open position, the cavity is unobstructed by the door, wherein when the door is in the closed position, a portion of the cavity is covered by the door.

4. The fixture of claim 3, wherein the fixture includes a magnet for securing the door in the closed position.

5. The fixture of claim 1, wherein the first fiber retention structure is aligned with a longitudinal axis of the main body.

6. The fixture of claim 1, further including a second fiber retention structure, wherein the second fiber retention structure includes a pair of channel structures separated by a central member.

7. The fixture of claim 6, wherein the central member includes a pair of overhang portions extending over the pair of channel structures.

8. A fixture for retaining an optical connector holder and optical fibers for splicing in an optical fiber stripping machine, the fixture comprising:
    a) a main body extending between a first end and a second end;
    b) a cavity defined within the main body, the cavity configured for receiving an optical cable holder of an optical fiber connector;
    c) a first fiber retention structure for holding the optical fibers extending from the connector holder, the first fiber retention structure including a pair of channels separated by a central member; and
    d) a second fiber retention structure for holding the optical fibers, the second fiber retention structure being spaced from the first fiber retention structure and including a pair of channels separated by a central member.

9. The fixture of claim 8, wherein the cavity extends from the first end to the second end of the main body.

10. The fixture of claim 8, wherein the fixture additionally includes a door operable between an open position and a closed position, wherein when the door is in the open position, the cavity is unobstructed by the door, wherein when the door is in the closed position, a portion of the cavity is covered by the door.

11. The fixture of claim 10, wherein the fixture includes a magnet for securing the door in the closed position.

12. The fixture of claim 8, wherein the first and second fiber retention structures are aligned with a longitudinal axis of the main body.

13. The fixture of claim 11, wherein the first fiber retention structure is defined by a pair of sidewalls, wherein each of the sidewalls includes an overhang portion extending over the channel structures.

14. The fixture of claim 8, wherein the second fiber retention structure includes a pair of overhang portions extending over the pair of channel structures.

15. A method for stripping optical fibers of an optical connector, the method comprising:
    a) providing a fixture including a main body having a cavity and at least one fiber retention structure, the at least one fiber retention structure including a pair of channel structures separated by a central member and being defined by a pair of sidewalls each of which includes an overhang portion extending over one of the channel structures, the main body defining a longitudinal axis;
    b) securing an optical cable to a holder of the optical connector such that at least two optical fibers extend beyond the holder;
    c) inserting the holder into the cavity such that the at least two optical fibers extend beyond the fixture main body;
    d) routing the at least two optical fibers through the at least one fiber retention structure such that a portion of the at least two optical fibers extending beyond the fixture main body are in a generally parallel, spaced apart arrangement, and oriented in a generally parallel relationship to the longitudinal axis of the fixture main body;
    e) inserting the fixture into an optical fiber stripping machine; and
    f) stripping a portion of the at least two optical fibers.

16. The method of claim 15, further including the step of closing a door of the fixture to secure the at least two optical fibers within the cavity.

17. The method of claim 15, wherein the at least two optical fibers includes two optical fibers.

* * * * *

UNITED STATES PATENT AND TRADEMARK OFFICE
CERTIFICATE OF CORRECTION

PATENT NO. : 12,099,237 B2
APPLICATION NO. : 17/056379
DATED : September 24, 2024
INVENTOR(S) : Mark D. Narum et al.

Page 1 of 1

It is certified that error appears in the above-identified patent and that said Letters Patent is hereby corrected as shown below:

In the Claims

Column 10, Line 24, Claim 13: "claim 11," should read --claim 8,--

Signed and Sealed this
Twenty-second Day of April, 2025

Coke Morgan Stewart
*Acting Director of the United States Patent and Trademark Office*